United States Patent [19]

Peehs et al.

[11] Patent Number: 4,774,051

[45] Date of Patent: Sep. 27, 1988

[54] SINTERED NUCLEAR FUEL COMPACT AND METHOD FOR ITS PRODUCTION

[75] Inventors: Martin Peehs, Bubenreuth; Wolfgang Dörr, Herzogenaurach, both of Fed. Rep. of Germany

[73] Assignee: Kraftwerk Union Aktiengesellschaft, Mülheim, Fed. Rep. of Germany

[21] Appl. No.: 24,819

[22] Filed: Mar. 12, 1987

[30] Foreign Application Priority Data

Mar. 24, 1986 [DE] Fed. Rep. of Germany ....... 3610899

[51] Int. Cl.⁴ .............................................. G21C 21/02
[52] U.S. Cl. ....................... 376/419; 264/0.5; 264/60; 264/125; 252/637; 252/638; 252/643
[58] Field of Search ....................... 376/419, 421, 422; 264/0.5, 60, 125; 252/637, 638, 643; 423/15

[56] References Cited

U.S. PATENT DOCUMENTS

| | | | |
|---|---|---|---|
| 3,349,152 | 10/1967 | Watanabe | 264/0.5 |
| 3,372,213 | 3/1968 | Nishiyama et al. | 264/0.5 |
| 3,427,222 | 2/1969 | Biancheria et al. | 376/419 |
| 3,501,411 | 3/1970 | Triggiani | 252/301.1 |
| 3,520,958 | 7/1970 | Versteeg et al. | 264/0.5 |
| 3,917,768 | 11/1975 | Daga | 264/0.5 |
| 4,671,904 | 6/1987 | Dorr | 264/0.5 |

FOREIGN PATENT DOCUMENTS

| | | |
|---|---|---|
| 1447546 | 6/1966 | France . |
| 1503127 | 10/1967 | France . |
| 3142447 | 4/1983 | Fed. Rep. of Germany . |
| 3144684 | 4/1983 | Fed. Rep. of Germany . |

OTHER PUBLICATIONS

Euratom Info., vol 7; No. 11, Nov. 1969, p. 739.

*Primary Examiner*—Donald P. Walsh
*Attorney, Agent, or Firm*—Herbert L. Lerner; Laurence A. Greenberg

[57] ABSTRACT

A sintered nuclear fuel compact of $UO_2$ or the mixed oxides $(U, Pu)O_2$ and $(U, Th)O_2$, with which reactivity losses in a nuclear reactor having relatively long fuel element cycles are avoided, has in its sintered matrix neutron poison in the chemical compound form $UB_x$ with $x=2$; 4 and/or 12 and/or $B_4C$. A sintered nuclear fuel compact of this kind is produced by sintering from a compact comprising a mixture of at least one of the mixture components $UO_2$, $PuO_2$, $(U, Pu)O_2$ and $(U, Th)O_2$ powder with $UB_x$ powder, where $x=2$; 4 and/or 12 and/or $B_4C$ powder.

4 Claims, No Drawings ered nuclear fuel compact, $UO_2$ starting powder is
SINTERED NUCLEAR FUEL COMPACT AND METHOD FOR ITS PRODUCTION

BACKGROUND OF THE INVENTION

1. Field of the Invention

The invention relates to a sintered nuclear fuel compact of $UO_2$ or the mixed oxides $(U, Pu)O_2$ and $(U, Th)O_2$, with a neutron poison that is incorporated in the sintered matrix, as well as a method for producing this sintered nuclear fuel compact.

2. Description of the Prior Art

A sintered nuclear fuel compact of this kind along with a method for its production is known from German Pat. No. 31 44 684 and related U.S. Pat. No. 4,512,939. The neutron poison comprises a rare earth element, in particular gadolinium. To produce this sintered nuclear fuel compact, $UO_2$ starting powder is mixed with rare earth oxide powder $(Gd_2O_3)$ and the mixture is compressed into a compact, which is subjected to a heat treatment in the temperature range of from 1500° C. to 1750° C. in a sintering atmosphere having a reducing effect. The holding time for this temperature may be in the range from one hour to ten hours, while the heating speed of the compact may be in the range from 1° C. per minute to 10° C. per minute.

Fuel rods of nuclear reactor fuel elements are filled with sintered nuclear fuel compacts of this kind. The rare earth elements and gadolinium in particular are neutron poisons that can be burned up in terms of neutron physics and that lose their neutron-poisoning property after a certain period of use of the nuclear fuel element in a nuclear reactor. A nuclear fuel element is for example used in the nuclear reactor over the course of three successive fuel element cycles, which are typically of equal length. At the end of one fuel element cycle, some of the fuel elements in a nuclear reactor are replaced with fresh unirradiated nuclear fuel elements. If the fuel element cycles are relatively long, the rare earth elements, and the gadolinium in particular, in the fuel elements freshly introduced into the nuclear reactor do not burn up completely by the end of their first fuel element cycle. A so-called residual poisoning remains, which causes undesirable losses in reactivity at the beginning of the next fuel element cycle in the nuclear reactor.

SUMMARY OF THE INVENTION

It is the object of the invention to disclose a sintered nuclear fuel compact with which such reactivity losses are avoided during relatively long fuel element cycles.

With the foregoing and other objects in view, there is provided in accordance with the invention a sintered nuclear fuel compact with which reactivity losses in a nuclear reactor having long fuel element cycles are avoided, comprising, a nuclear fuel oxide selected from the group consisting of $UO_2$, mixed oxide $(U, Pu)O_2$ and mixed oxide $(U, Th)O_2$ and mixtures thereof, having a neutron poison incorporated in the sintered matrix, said neutron poison selected from the group of the chemical compound form $UB_x$ with $x = 2$; 4 and/or 12 and the chemical compound $B_4C$ and mixtures of such chemical compounds.

In accordance with the invention, there is provided a method of producing a sintered nuclear fuel compact with which reactivity losses in a nuclear reactor having long fuel element cycles are avoided, which comprises, forming a compact of a mixture of powders containing at least one nuclear fuel oxide selected from the group consisting of $UO_2$, mixed oxide $(U, Pu)O_2$ and mixed oxide $(U, Th)O_2$, and at least one neutron poison selected from the group consisting of $UB_x$, where $x = 2$; 4 and/or 12 and $B_4C$, and sintering the compact of the mixture of powders.

Other features which are considered as characteristic for the invention are set forth in the appended claims.

Although the invention is illustrated and described herein as embodied in sintered nuclear fuel compact and method for its production, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DESCRIPTION OF THE PREFERRED EMBODIMENTS

For attaining this object, a sintered nuclear fuel compact of the above-described type is characterized in accordance with the invention in that the neutron poison has the chemical compound form $UB_x$; where $x = 2$; 4 and/or 12 and/or $B_4C$.

Boron is also a neutron poison that can be burned up in terms of neutron physics. While the burn-up characteristic of gadolinium is optimal for 12-month fuel element cycles, the burn-up characteristic of boron is optimal for 18-month fuel element cycles.

The boron content in the sintered matrix is advantageously a maximum of 5% by weight. Favorably, it is in the range from 100 ppm to 1% by weight.

For producing a sintered nuclear fuel compact according to the invention, advantageously a compact of a mixture of at least one of the mixture components $UO_2$, $PuO_2$, $ThO_2$, $(U, Pu)O_2$ and $(U, Th)O_2$ powder with $UB_x$ powder, where $x = 2$; 4 and/or 12 and/or $B_4C$ powder, is produced and subsequently sintered.

It has been found that when these boron compounds are used the boron virtually does not escape at all during the sintering but instead remains in the sintered matrix of the sintered nuclear fuel compact obtained.

The chemical compound forms $UB_x$ and $B_4C$ are favorably distributed over the entire sintered matrix of the sintered nuclear fuel compact. This distribution is favorably homogeneous.

It is also favorable to use mixture components $UO_2$, $PuO_2$, $ThO_2$, $(U, Pu)O_2$ and $(U, Th)O_2$ powder in which the total fluorine content is less than 100 ppm. Because of the low fluorine content, an escape of the boron during sintering is suppressed still further.

It is also advantageous if the mixture components $UO_2$, $PuO_2$, $ThO_2$, $(U, Pu)O_2$ and $(U, Th)O_2$ powder have a mean particle diameter of 5 $\mu m$ to 100 $\mu m$. A powder of this kind is particularly pourable and thereby promotes the homogeneous incorporation of the $UB_x$ and $B_4C$ powders.

The sintering may be performed, by way of example, by the method mentioned above and described in the German Pat. No. 31 44 684 and related U.S. Pat. No. 4,512,939, in a reducing sintering atmosphere, such as in a pure hydrogen atmosphere.

However, the sintering may also be performed in accordance with the method described in German Pat. No. 31 42 447 and related U.S. Pat. No. 4,578,229 and to subject the compact, which also contains $UB_x$ and/or $B_4C$ powder, to a heat treatment at a treatment temperature in the range from 1000° C. to 1400° C., initially in an oxidizing gas atmosphere and then in a reducing gas atmosphere. Carbon dioxide is for example suitable as an oxidizing gas atmosphere, and hydrogen is suitable as a reducing gas atmosphere. If the compact contains $B_4C$, then when $CO_2$ is used as an oxidizing gas atmosphere, boron losses during sintering are avoided quite particularly reliably.

From U.S. Pat. No. 3,427,222 (Example I), a sintered nuclear fuel compact of $UO_2$ having boron as the neutron poison is known; however, this boron is not incorporated in the sintered matrix of the sintered nuclear fuel compact but instead is located in a surface layer which contains boron compounds and is applied to the sintered nuclear fuel compact, for example, by spray deposition.

The application of this surface layer to the sintered nuclear fuel compact is an additional method step, however, which is very expensive because a predetermined layer thickness must be adhered to very precisely. The surface layer is also very porous and must therefore be protected against the absorption of moisture by means of a special protective coating.

The invention and its advantages will now be described in greater detail in terms of two exemplary embodiments.

$UO_2$ powder having a mean particle diameter of 15 μm and having a fluorine content of 60 ppm is obtained in accordance with the ammonium uranyl method described in the *Gmelin Handbuch der anorgaischen Chemie, Uran* [Gmelin, Handbook of Inorganic Chemistry, Uranium], supplemental volume A3, pages 101–104, 1981, by suitably selecting the dwell time of the powder under pyrohydrolysis conditions. With this $UO_2$ powder, 2% by weight of $UB_4$ powder having particle sizes in the range from 2 to 100 μm are intimately mixed. The powder mixture is then compressed into compacts having a density of 5.6 g/cm³. These compacts are subjected in a sintering furnace in a sintering atmosphere of pure hydrogen to a heat treatment at a temperature of 1700° C. for two hours.

By this means, sintered nuclear fuel compacts having a density of 10.5 g/cm³ and a boron content of 3000 ppm are obtained from the compacts. The boron is uniformly distributed everywhere in the sintered matrix of the sintered nuclear fuel compacts.

For the further exemplary embodiment, the same $UO_2$ powder having a fluorine content of 60 ppm and a mean particle diameter of 15 μm is intimately mixed with 300 ppm of $B_4C$ powder, the particle sizes of which are in the range from 2 to 100 μm. The powder mixture is again compressed into compacts having a density of 5.6 g/cm³. The compacts are then initially sintered in a sintering furnace in an oxidizing sintering atmosphere comprising $CO_2$ for two hours at 1150° C. Then the sintered compacts produced from the compacts are subjected in the sintering furnace, while maintaining their temperature of 1150° C., for a one-half-hour heat treatment in a reducing gas atmosphere comprising pure hydrogen.

The density of the sintered nuclear fuel compacts finally obtained thereby is 10.5 g/cm³. The sintered nuclear fuel compacts contain 235 ppm of boron in homogeneous distribution in the entire sintered matrix.

The foregoing is a description corresponding, in substance, to German application No. P 36 10 899.5, dated Mar. 24, 1986, international priority of which is being claimed for the instant application and which is hereby made part of this application. Any material discrepancies between the foregoing specification and the specification of the aforementioned corresponding German application are to be resolved in favor of the latter.

There is claimed:

1. A method of producing a sintered nuclear fuel compact with which reactivity losses in a nuclear reactor having long fuel element cycles are avoided, which comprises, forming a compact of a mixture of powders containing at least one nuclear fuel oxide selected from the group consisting of $UO_2$, $PuO_2$, $ThO_2$, mixed oxide (U, Pu)$O_2$ and mixed oxide (U, Th)$O_2$, at least one neutron poison selected from the group consisting of $UB_x$, where x=2; 4 and/or 12 and $B_4C$, and sintering the compact of the mixture of powders so that the neutron poison is embedded in a sintered matrix of the nuclear fuel oxide at a treatment temperature in a range from 1000° C. to 1400° C. in an oxidizing sintering atmosphere, and then heat treating the sintered compact in a reducing gas atmosphere.

2. A method as defined by claim 1, wherein the nuclear fuel oxide component of the mixture of powders selected from the group consisting of $UO_2$, $PuO_2$, $ThO_2$, (U, Pu)$O_2$ and (U, Th)$O_2$ have a total content of fluorine which is less than 100 ppm.

3. A method as defined by claim 1, wherein the nuclear fuel oxide component of the mixture of powders selected from the group consisting of $UO_2$, $PuO_2$, $ThO_2$, (U, Pu)$O_2$ and (U, Th)$O_2$ powder, have a mean particle diameter in the range from 5 μm to 100 μm.

4. A method according to claim 1, wherein the oxidizing sintering atmosphere is a carbon dioxide atmosphere, and the reducing gas atmosphere is a hydrogen atmosphere.

* * * * *